US009024946B2

(12) United States Patent
Brown et al.

(10) Patent No.: US 9,024,946 B2
(45) Date of Patent: May 5, 2015

(54) TESSELLATION SHADER INTER-THREAD COORDINATION

(75) Inventors: Patrick R. Brown, Wake Forest, NC (US); Christopher T. Dodd, Woodside, CA (US); Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1145 days.

(21) Appl. No.: 12/879,976

(22) Filed: Sep. 10, 2010

(65) Prior Publication Data

US 2011/0063294 A1    Mar. 17, 2011

Related U.S. Application Data

(60) Provisional application No. 61/241,847, filed on Sep. 11, 2009.

(51) Int. Cl.
*G06T 15/30*     (2011.01)
*G06T 15/00*     (2011.01)

(52) U.S. Cl.
CPC .................... *G06T 15/005* (2013.01)

(58) Field of Classification Search
CPC .................. G06T 15/30; G06T 17/20
USPC ........................................... 345/423
See application file for complete search history.

(56) References Cited

U.S. PATENT DOCUMENTS

| 5,638,503 | A | * | 6/1997 | Hoel | 345/442 |
| 6,037,949 | A | * | 3/2000 | DeRose et al. | 345/582 |
| 6,078,331 | A | * | 6/2000 | Pulli et al. | 345/423 |
| 2002/0118188 | A1 | * | 8/2002 | Zviaguina et al. | 345/421 |
| 2005/0012750 | A1 | * | 1/2005 | Uesaki et al. | 345/531 |
| 2006/0125824 | A1 | * | 6/2006 | Sfarti | 345/423 |

* cited by examiner

*Primary Examiner* — Said Broome
(74) *Attorney, Agent, or Firm* — Artegis Law Group, LLP

(57) ABSTRACT

One embodiment of the present invention sets forth a technique for performing a computer-implemented method for tessellating patches. An input block is received that defines a plurality of input patch attributes for each patch as well as instructions for processing each input patch. A plurality of threads is launched to execute the instructions to generate each vertex of a corresponding output patch based on the input patch. Reads of values written during instruction execution are synchronized so threads can read and further process the values of other threads. An output patch is then assembled from the outputs of each of the threads; and emitting the output patch for further processing.

20 Claims, 9 Drawing Sheets

TESSELLATION SHADER INTER-THREAD COORDINATION

CROSS-REFERENCE TO RELATED APPLICATIONS

This application claims priority benefit to United States provisional patent application titled, "API EXTENSIONS FOR ADVANCED GRAPHICS PROCESSING UNITS" filed on Sep. 11, 2009 and having Ser. No. 61/241,847.

BACKGROUND OF THE INVENTION

1. Field of the Invention

The present invention generally relates to GPU application programming interfaces and more specifically to tessellating a patch using one or more shaders.

2. Description of the Related Art

In prior art for programmable tessellation interfaces such as DirectX 11, coordination amongst threads converting an input patch into a representation of the patch suitable for vertex evaluation over the patch's domain requires a high-level shader structured as the execution of a sequence of distinct program entry points. Such conversion of the input patch is performed when the high-level shader computes, using one or more threads, per-vertex and per-patch attributes for an output patch that is produced by the high-level shader's execution. The plurality of threads that are associated with the high-level shader execute independently and have no mechanism to communicate in order to coordination their computations. After all threads complete their execution of a program in the sequence, the subsequent high-level shader performs additional operations on the output patch to further compute attributes. Here, this subsequent high-level shader can read the outputs written by the prior shader execution described above, but cannot write or otherwise modify those inputs; it can only write its own per-thread outputs.

Expressing communication between multiple threads during this patch conversion process in separate shaders is cumbersome and less efficient than allowing coordinated communication among threads during a single shader execution. However coordinated communication requires mechanisms not present in the prior art. Well-known multi-threaded communication hazards such as read-modify-write hazards complicate coordination of threads. Conventional techniques such as locking for mutual exclusion are unavailable and not sufficiently efficient given the fast rate of tessellated patch processing within a graphics processor.

Accordingly, what is needed in the art is a technique for reliably synchronized coordination amongst threads when converting an input patch.

SUMMARY OF THE INVENTION

A method for an improved technique for tessellating patches. An input block is received that defines a plurality of input patch attributes for each patch as well as instructions for processing each input patch. A plurality of threads is launched to execute the instructions to generate each vertex of a corresponding output patch based on the input patch. Reads of values written during instruction execution are synchronized so threads can read and further process the values of other threads. An output patch is then assembled from the outputs of each of the threads; and emitting the output patch for further processing.

A processor configured to tessellate a plurality of patches. The processor receives an input block that defines a plurality of input patches as well as instructions for processing each of the input patches, and also receives an output block to which the plurality of output patches are written. For each of the vertices of the output patches, a different thread is launched to generate each vertex of the corresponding output patch based on one or more of the input vertex attributes that correspond to the input patch and the instructions. The reads of values written during instruction execution are synchronized so threads can read and further process the values of other threads.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
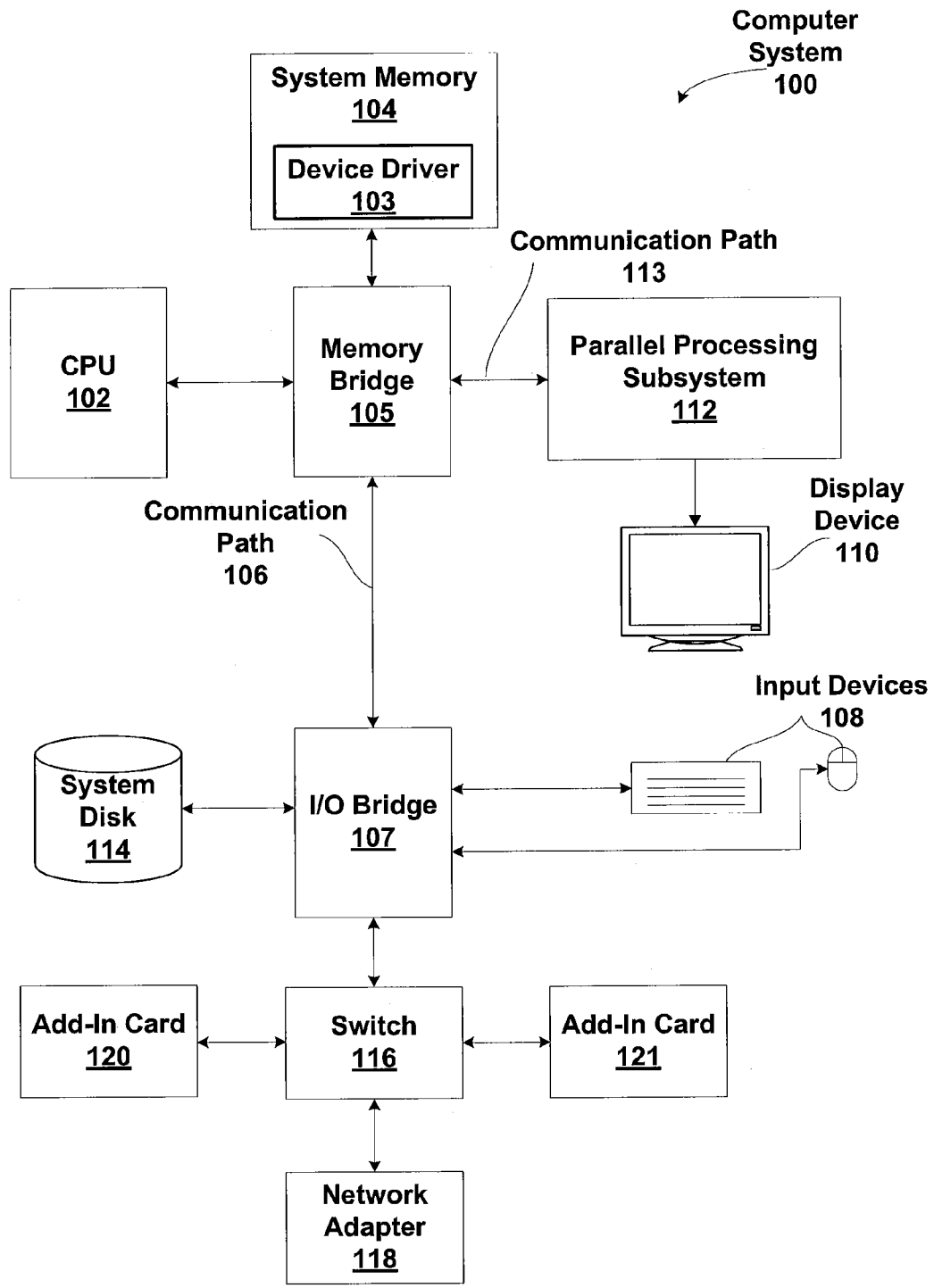
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
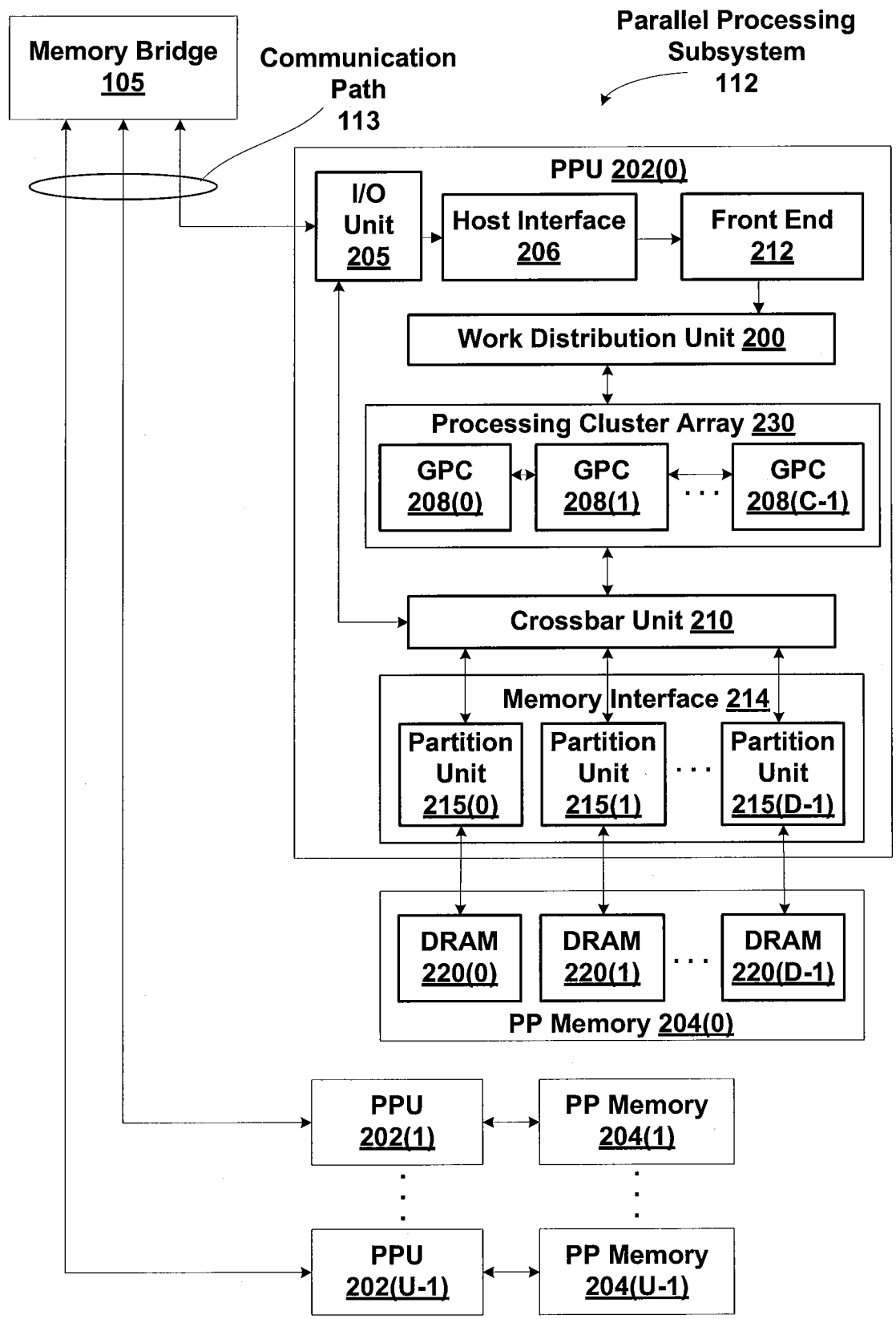
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1 (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1.

Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
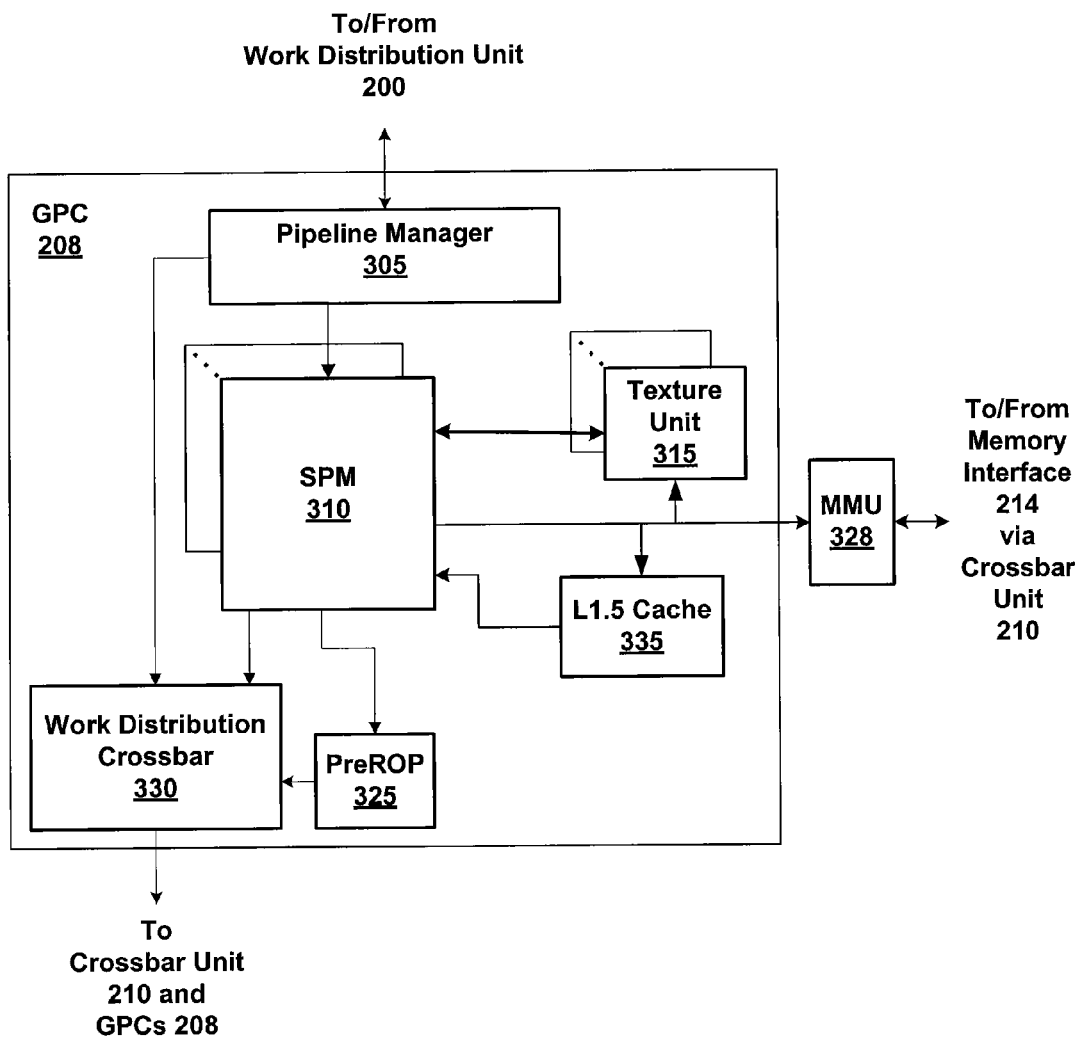
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
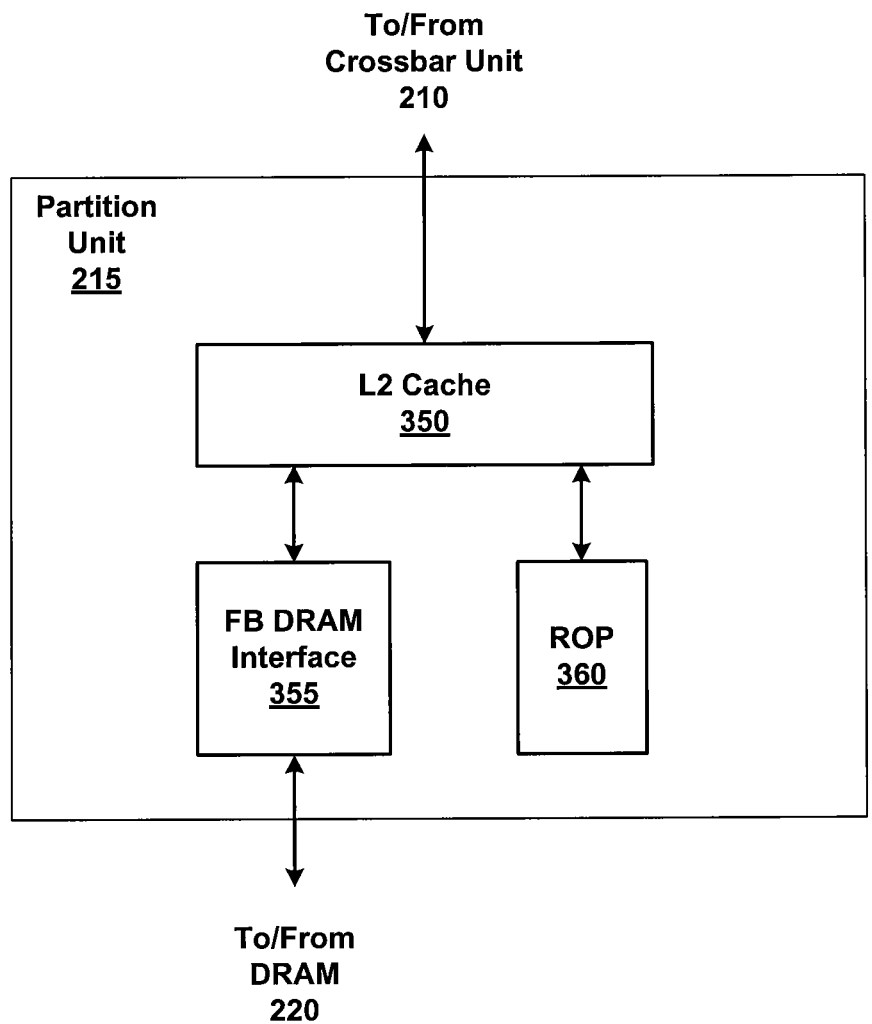
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
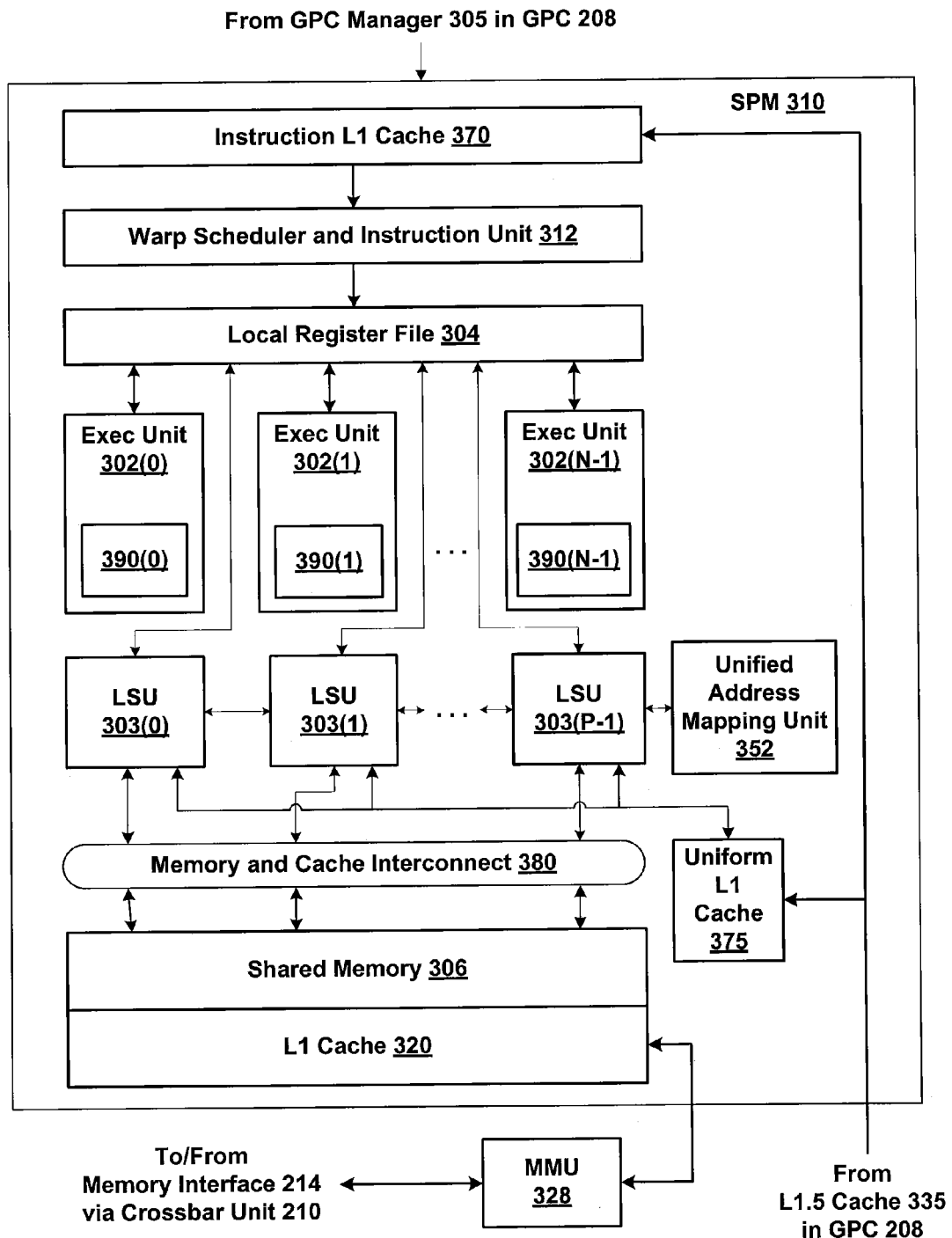
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Graphics Pipeline Architecture

Figure 4:
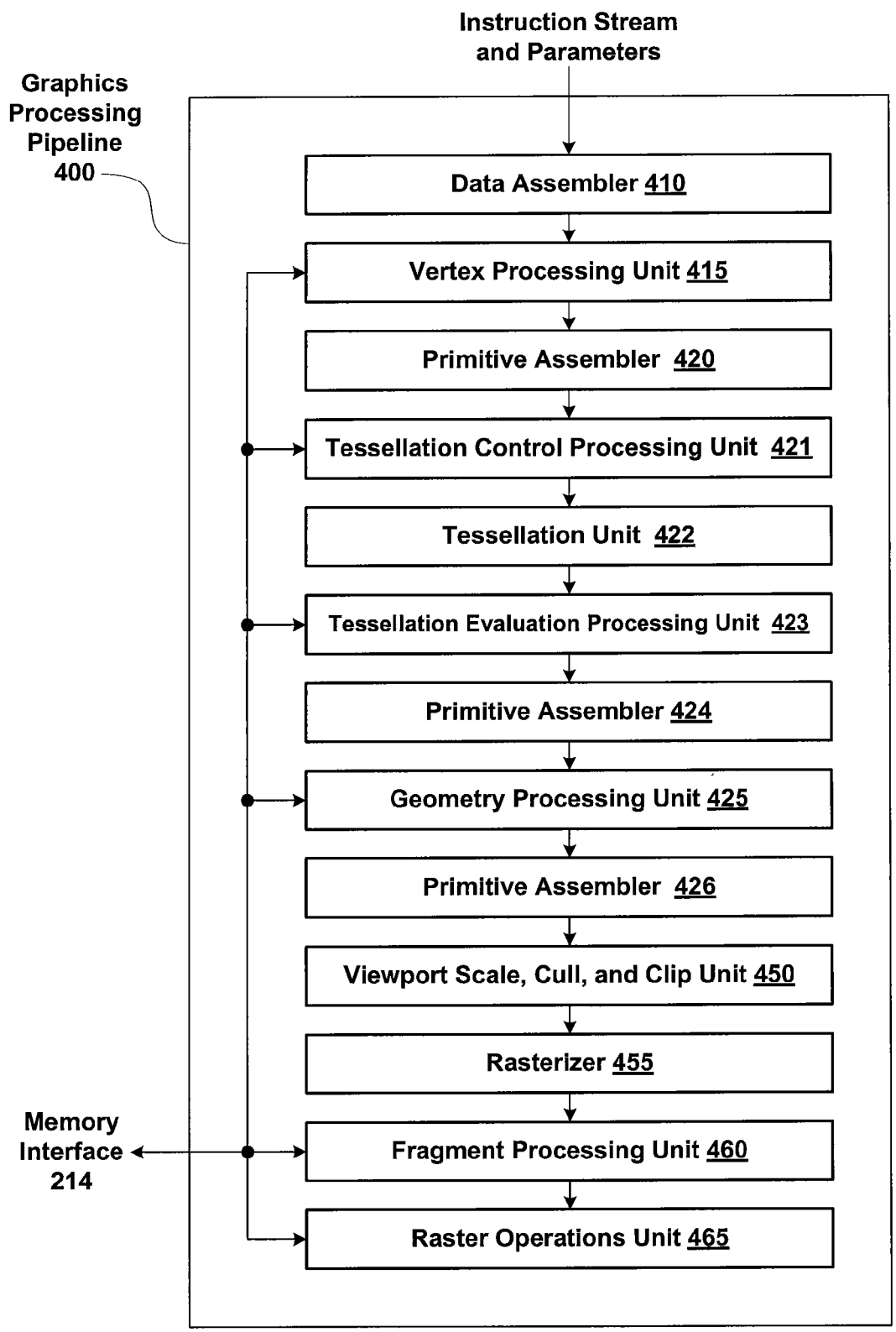
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a tessellation control processing unit 421, a tessellation evaluation processing unit 423, a geometry processing unit 425, and a fragment processing unit 460. The functions of data assembler 410, primitive assemblers 420, 424, 426, tessellation primitive generator 422, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by tessellation control processing unit 421. Graphics primitives include triangles, line segments, points, patches, and the like.

The tessellation control processing unit 421 treats the input vertices as control points for a geometric patch and transforms these control points from the patch's input representation, often called the patch's basis, into a representation suitable for efficient surface evaluation by the tessellation evaluation shader 423. The tessellation control processing unit 421 also computes tessellation factors for edges of geometric patches. A tessellation factor applies to a single edge and quantifies a view-dependent level of detail associated with the edge. A tessellation primitive generator 422 is configured to receive the tessellation factors for edges of a patch and to tessellate the patch into multiple geometric primitives such as line, triangle, or quadrilateral primitives, which are transmitted to a tessellation evaluation processing unit 423. The tessellation evaluation processing unit 423 operates on parameterized coordinates of the subdivided patch to generate a surface representation and vertex attributes for each vertex associated with the geometric primitives.

Primitive assembler 424 receives vertex attributes from tessellation evaluation processing unit 423, reading stored vertex attributes, as needed, and constructs graphics primitived for processing by geometry processing unit 425. Geometry processing unit 425 is a programmable execution unit that is configured to execute geometry shader programs, transforming graphics primitives received from primitive assembler 424 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to primitive assembler 426, which receives the parameters and vertices from the geometry processing unit 425, reading stored vertex attributes, as needed, and constructs graphics primitives for processing by a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Tessellation Shader Inter-Thread Coordination

The present invention pertains to the three tessellation shader stages to the graphics processing pipeline 400: two new shader types—tessellation control processing unit 421 and tessellation evaluation processing unit 423, and a fixed-function component—tessellation primitive generator 422.

These shader stages receive patches after the patches have been processed by a vertex shader or a by fixed-function vertex processor, where each patch consists of a fixed-size collection of vertices, per-vertex attributes, and a number of associated per-patch attributes.

A tessellation control processing unit 421 executes shader instructions that are specified within a shader program. The tessellation control processing unit 421 consumes a variable-sized input patch provided by primitive assembler 420 and produces a fixed-size output patch. The output patch comprises an array of vertices and a set of per-patch attributes. Such per-patch attributes include inner and outer tessellation levels that specify how finely the output patch should be subsequently tessellated. For each input patch that is processed by the tessellation control processing unit 421, multiple threads within the tessellation control processing unit 421 are created and executed. Each thread corresponds to an output patch vertex and writes the per-vertex attributes of the corresponding output patch vertex. Each thread may read the output patch vertices of the other threads, but can only write to its corresponding output patch vertex. The per-patch attributes of the output patch are computed collectively by the plurality of tessellation control shader threads, where any thread may write to any per-patch attribute of the output patch. Though values that can be written and read between the tessellation control shader threads belong to the output patch, one skilled in the art may also appreciate that generalized values may also be shared between the tessellation control shader threads, such as intermediate values involved in computations.

Reads and writes to output patch vertices from the independently executing threads in a multi-threaded system may be performed in an unspecified order and cause largely undefined results, leading to potential data and processing corruptions within the graphics processing pipeline 400. To cure this deficiency, a "barrier" operation is provided and forces synchronization points where the execution of commands within each thread is halted until all threads have completed the execution of all commands specified prior to the barrier command. The barrier command therefore prevents a thread from, for example, reading an output that is being concurrently written to by a neighboring thread, which ensures well-defined and coherent processing within the graphics processing pipeline 400.

Next, the tessellation primitive generator 422 receives the output patch from the tessellation control processing unit 421 and decomposes the output patch into a new set of primitives based on the tessellation levels included in the per-patch attributes. The tessellation primitive generator 422 begins with either a triangle primitive or a quad primitive, and splits each outer edge of the primitive into a number of segments approximately equal to an outer tessellation level defined by the per-patch attributes. The interior of the primitive is tessellated according to the inner tessellation level included in the per-patch attributes. The tessellation primitive generator 422 operates in three modes: TRIANGLES and QUADS, which split a triangular or quad-shaped patch into a set of triangles that cover the output patch, and ISOLINES_NV, which splits a quad-shaped patch into a set of line strips that span the output patch. Each vertex that is generated by the tessellation primitive generator 422 is assigned a (u,v) or (u,v,w) coordinate that indicates the relative location of the vertex in the subdivided triangle or quad.

Finally, for each vertex produced by the tessellation primitive generator 422, a tessellation evaluation processing unit 423 is executed to compute the position and other attributes of the vertex using the (u,v) or (u,v,w) coordinate of the vertex. Patches with a rectangular shape have (u,v) coordinates while triangular patches have (u,v,w) coordinates. When computing the final vertex attributes, the tessellation evaluation processing unit 423 can also read the attributes of any of the vertices of the output patch previously written by the tessellation control processing unit 421. Tessellation evaluation processing unit 423 invocations are completely independent, although all invocations for a single patch share the same collection of input vertices and per-patch attributes.

The primitives generated by these new stages are then transmitted to subsequent stages of the graphics processing pipeline 400, where the primitives are used as standard inputs to geometry shaders, transform feedback, and/or the rasterizer.

The tessellation control and evaluation shaders are both optional. If no tessellation control processing unit 421 is present, the input patch provided by the shader program is passed directly to the tessellation primitive generator 422, and a set of application-specified default tessellation level parameters is used to control primitive generation. If no tessellation evaluation processing unit 423 is present, the output patch produced by the tessellation control processing unit 421 is passed as a patch to subsequent pipeline stages, as described above.

Input/Output Blocks for Passing Attributes of Patch Vertices

The present invention enhances the OpenGL Application Programming Interface (API) by allowing applications to specify the per-vertex and per-patch outputs as blocks of data. For example, the tessellation control processing unit 421 shader might output:

```
out stuff {
    vec4 position;
    vec3 normal;
    vec2 texcoord;
} outputs[16];
patch out patch_stuff {
    vec4 perPatchThing;
};
``` where the "outputs[gl_ThreadID].position=pos" code causes the corresponding gl_ThreadID to output data to the appropriate output block index.

Subsequently, the tessellation evaluation processing unit 423 might read the same values as:

```
in stuff {
    vec4 position;
    vec3 normal;
    vec2 texcoord;
} inputs[16];
patch in patch_stuff {
    vec4 perPatchThing;
};
```

As shown above, the input/output blocks are connected, by name, between graphics processing pipeline 400 stages. The input/output blocks allow optional shaders—such as the tessellation evaluation processing unit 423 and the tessellation control processing unit 421, to read an input block with a given name and write an output block with the same name, which advantageously minimizes the number of API calls required to transfer data between the shaders.

Without such additions, standard GLSL requires that all shaders be compiled and linked as a single unit. By contrast, input/output blocks serve as a common interface to allow for independent compilation so that the compiler can guarantee that shaders with matching input/output blocks match.

Tessellation Control Shader Programming Models

The programming model for the tessellation control processing unit 421 provides N independent threads, where N is the fixed number of vertices in the output patch specified by the shader program. Each vertex in this patch has a collection of per-vertex attributes. Full output patches also have a single collection of per-patch attributes. Each thread can read the output patch vertices of any other thread, either to assist in the computation of additional per-vertex attributes (by taking results from neighboring threads) or to compute per-patch attributes of the output patch. However, each thread is only able to write to a corresponding output patch vertex. As described above, such attributes include tessellation levels, which are used to determine how finely the output patch is subsequently subdivided in the graphics processing pipeline 400. The tessellation levels are typically computed by analyzing the final position of groups of control points that are processed by the tessellation control processing unit 421. An example of a patch with control points is depicted in FIG. 5 and described in detail below.

Figure 5:
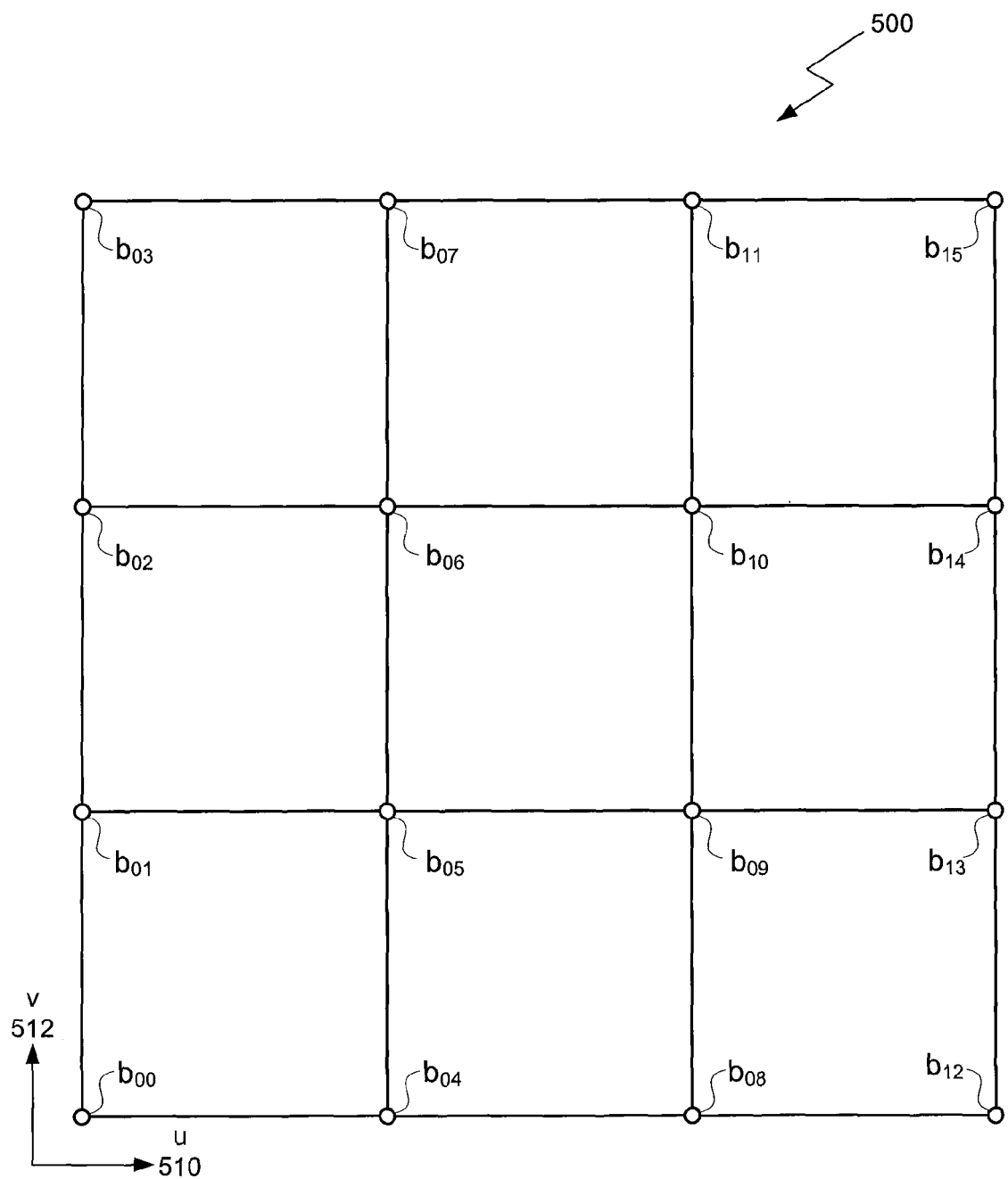
FIG. 5 illustrates a bicubic patch and corresponding control points, according to one embodiment of the present invention.

FIG. 5 illustrates an example bicubic patch 500 with control points $b_{00}$ through $b_{15}$, according to one embodiment of the present invention. As shown, the patch 500 includes sixteen control points $b_{00}$ through $b_{15}$. The sixteen control points are disposed in a grid in parametric space defined by parameter u 510 and parameter v 512. The position and labeling of each control point $b_{00}$ through $b_{15}$ represents a conventional labeling of indices for control points within a patch.

Persons skilled in the art will appreciate the present invention is not limited to bicubic patches. Other patch representations with differing numbers of control points and interpretations of the vertex attributes for those control points are expected. For example, Bezier triangular patches use 10 control points.

Two separate tessellation programming models are provided for operating on patches and the control points included in patches: one for assembly-level implementations, and another for high-level shaders.

Assembly-Level Programming Model

The assembly-level implementation is a text-based assembly programming model that allows application developers to write shader programs in a language that is closer to a hardware model. The assembly-level implementation provides an assembly target that can be used for off-line compilation of high-level shader programs using compilers such as the compiler for NVIDIA© Corporation's Cg programming language. When using off-line compilation of high-level shader programs, it is not necessary to execute the high-level shading language compiler each time the application program is executed, thereby enhancing the overall performance.

For assembly-level implementations of tessellation control shaders, all N threads are guaranteed to run in lockstep where, for a sequence of instructions, all threads complete execution of the same instruction before proceeding to a following instruction. This configuration provides reliable organization to the ordering and execution of instructions included in the shader program. For example, each thread can safely read any output patch vertex that was written to by a previous instruction. A set of rules are provided and specify an execution order on which applications can rely when executing more complex flow control constructs, such as conditional execution or loops. In addition, each thread may read the output patch vertices of other threads, however each thread may only write to its corresponding output patch vertex. This advantageously allows each thread to share the output patch vertices and prevents corruption of the output patch vertices that could be caused, for example, by cross-thread data writes.

Figure 6:
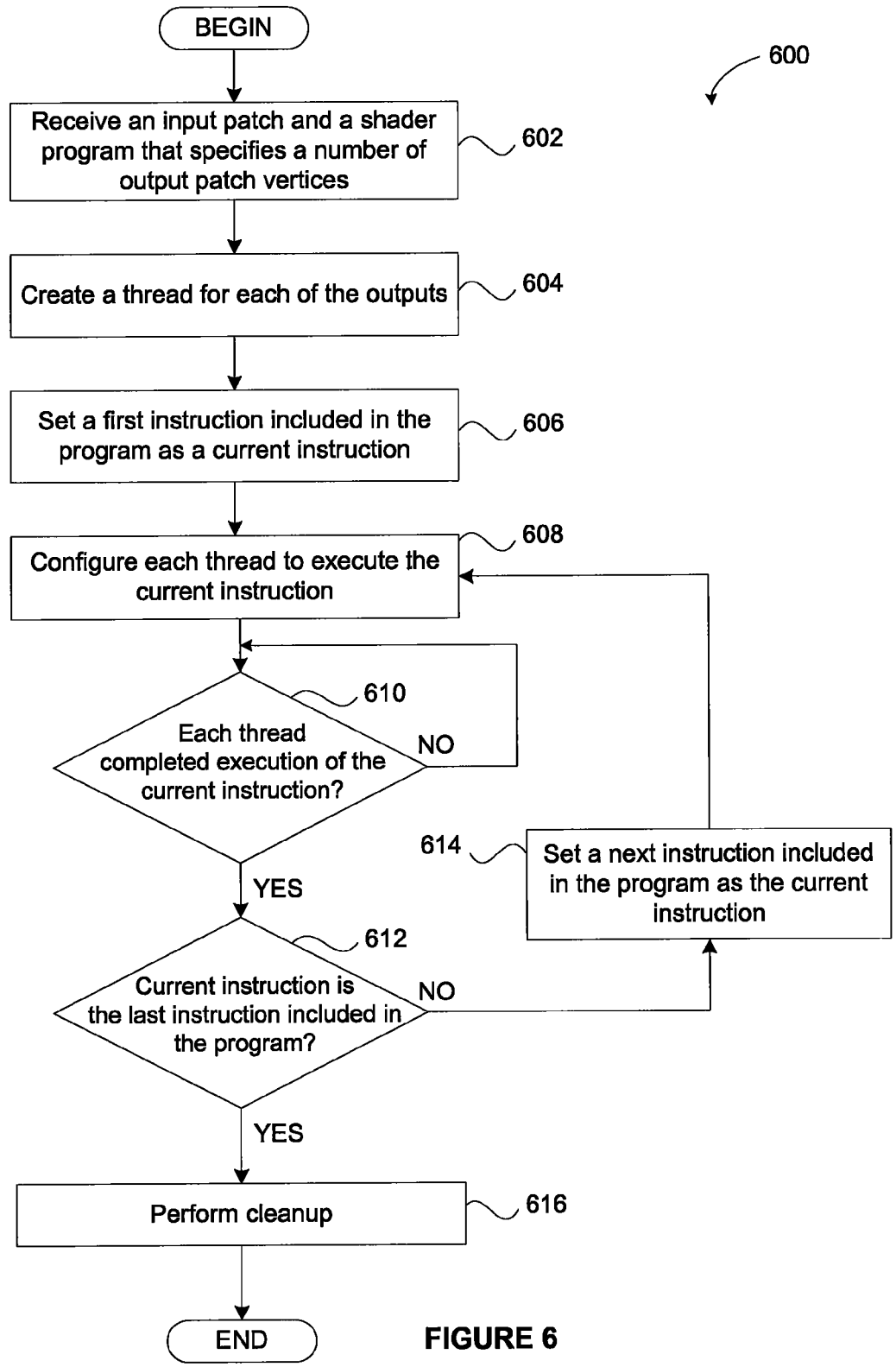
FIG. 6 is a flow diagram of method steps 600 for executing one or more assembly-level tessellation instructions in lockstep, according to one embodiment of the present invention.

FIG. 6 is a flow diagram of method steps 600 for executing one or more assembly-level tessellation instructions in lockstep, according to one embodiment of the present invention. Although the method steps are described in conjunction with the systems of FIGS. 1, 2, 3A, 3B, 3C and 4, persons skilled in the art will understand that any system configured to perform the method steps, in any order, is within the scope of the inventions.

The method begins at step 602, where the GPC 208 of FIG. 3A receives an input patch (exemplified by patch 500) and a shader program that specifies a number of output patch vertices. As described above, the number of output patch vertices is fixed by the shader program, and a thread is created for each of the outputs, as described below in step 604.

At step 604, the GPC 208 creates a thread for each of the outputs. Each thread is assigned an identification ID that is equivalent to one of the outputs. Thus, each thread ID is unique within a tessellation control shader execution instance and may be used to index a data structure that is used to access the inputs or outputs, such as an array.

At step 606, the GPC 208 sets a first instruction included in the program as a current instruction. At step 608, the GPC 208 configures each thread to execute the current instruction.

At step 610, the GPC 208 determines whether each thread has completed execution of the current instruction. In one embodiment, the GPC 208 manages a system of callbacks to determine whether each of the threads has completed the execution of the current instruction. If, at step 610, the GPC 208 determines that each thread has not completed execution of the current instruction, then the step 610 is repeated. Thus, each thread that has completed execution of the current instruction must wait for each and every thread to complete their execution of the assigned instruction.

When the GPC 208 determines that each thread has completed execution of the current instruction, the method 600 proceeds to step 612. At step 612, the GPC 208 determines whether the current instruction is the last instruction included in the program. If, at step 612, the GPC 208 determines that the current instruction is not the last instruction included in the program, then the method 600 proceeds to step 614, where the GPC 208 sets a next instruction included in the program as the current instruction. The method steps 608-612 are repeated until and each and every instruction included in the shader program has been executed by each of the threads.

Referring back to step 612, if the GPC 208 determines that the current instruction is the last instruction included in the program, then the method 600 proceeds to step 616, where the GPC 208 performs any cleanup that is required before moving on to the next shader program. This cleanup includes forming an output patch from the output per-vertex and per-patch attributes and forwarding this patch to tessellation control shader 421.

High-Level Programming Model

As in the assembly-level programming model, for high-level tessellation control shaders, one thread is created for each output patch vertex. Each thread can write to its corresponding output patch vertex and read the output patch vertices corresponding to any other thread, without requiring the lock-step execution configuration of the assembly-level programming model. A barrier instruction is provided to control the execution of instructions by each of the threads. When a thread reaches a barrier instruction, that thread halts the execution of any subsequent instructions until all other threads reach the same barrier instruction. Therefore, barriers guarantee that any instructions that are defined prior to a barrier have completed in execution before the barrier is marked as completed. A programming model with explicit barriers is particularly advantageous for hardware implementations of the tessellation control shader programming model without the ability to easily support the lockstep execution model of the assembly-level programming model above.

Figure 7:
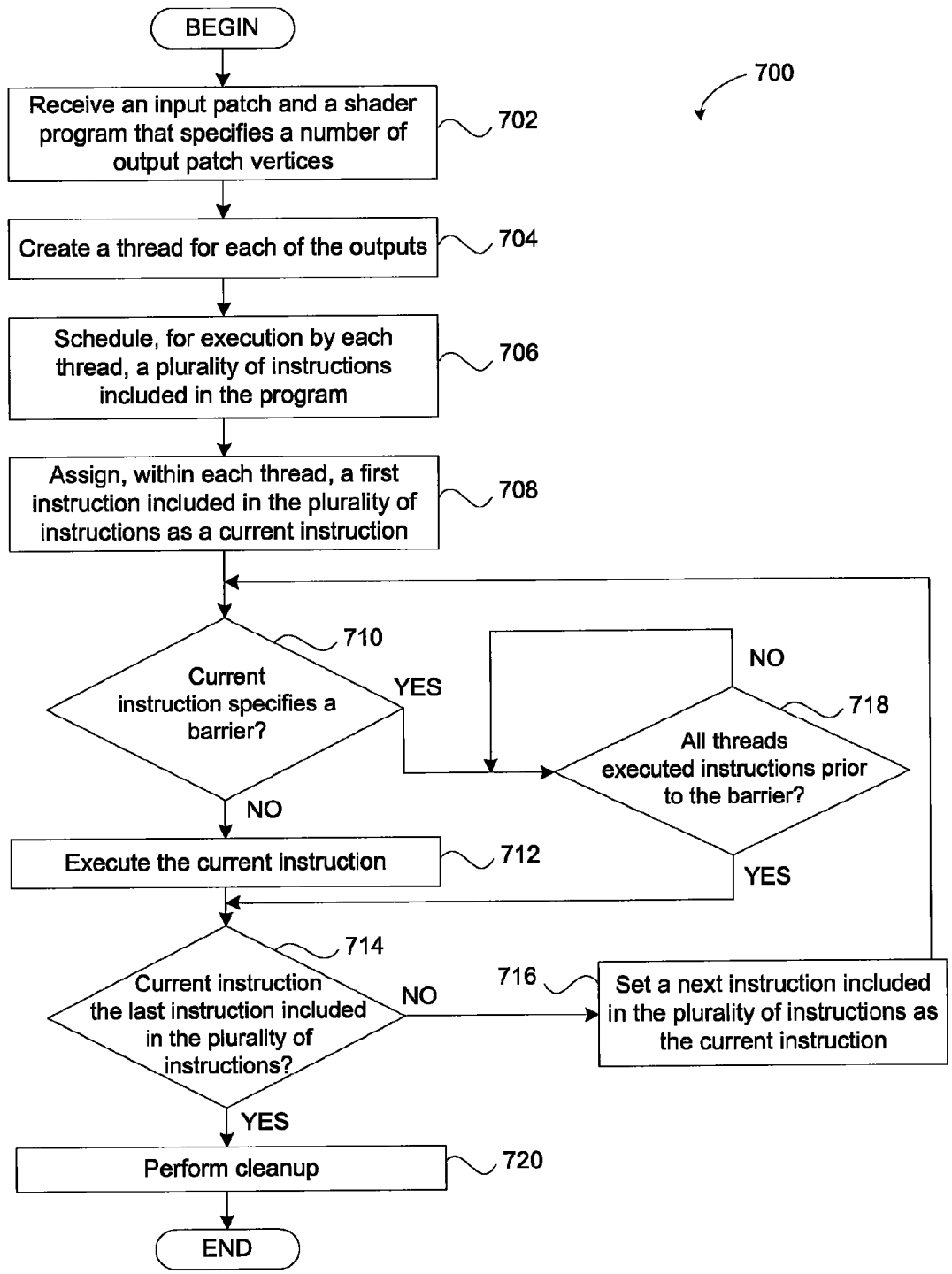
FIG. 7 is a flow diagram of method steps 700 for executing one or more high-level tessellation instructions using barriers, according to one embodiment of the present invention.

FIG. 7 is a flow diagram of method steps 700 for executing one or more high-level tessellation instructions using barriers, according to one embodiment of the present invention. Although the method steps are described in conjunction with the systems of FIGS. 1, 2, 3A, 3B, 3C and 4, persons skilled in the art will understand that any system configured to perform the method steps, in any order, is within the scope of the inventions.

At step 702, the GPC 208 receives an input patch and a shader program that specifies a number of output patch vertices. Similar to steps 402-404 described above, the number of output patch vertices is fixed, and a thread is created for each of the outputs, as described in step 704.

At step 706, the GPC 208 schedules, for execution by each thread, a plurality of instructions included in the program. At step 708, the GPC 208 assigns, within each thread, a first instruction included in the plurality of instructions as a current instruction. At step 710, the GPC 208 determines whether the current instruction specifies a barrier. If, at step 710, the GPC 208 determines that the current instruction does not specify a barrier, then the method 700 proceeds to step 712, where the current instruction is executed.

At step 714, the GPC 208 determines whether the current instruction is the last instruction included in the plurality of instructions. If, at step 714, the GPC 208 determines that the current instruction is not the last instruction included in the plurality of instructions, then the method 700 proceeds to step 716.

At step 716, the GPC 208 sets a next instruction included in the plurality of instructions as the current instruction. The method steps 710-716 are repeated until and each and every instruction included in the shader program has been executed by each of the threads.

Referring back to step 710, if the GPC 208 determines that the current instruction specifies a barrier, then the method 700 proceeds to step 718.

At step 718, the GPC 208 determines whether all other threads executed instructions prior to the barrier. If, at step 718, the GPC 208 determines that not all threads have been executed prior to the barrier, then the step 718 is repeated until all of the threads reach the barrier instruction. Conversely, if the GPC 208 determines that all threads have been executed prior to the barrier, then the method 700 proceeds to step 714, described above.

Referring back to step 714, if the GPC 208 determines that the current instruction is the last instruction included in the plurality of instructions, then the method 700 proceeds to step 720.

At step 720, the GPC 208 performs any cleanup that is required before moving on to the next shader program. This cleanup includes forming an output patch from the output per-vertex and per-patch attributes and forwarding this patch to tessellation control shader 421.

Capture and Playback of Patches

As described above, both the tessellation control processing unit 421 and the tessellation evaluation processing unit 423 are optionally included in the graphics processing pipeline 400. If the tessellation control processing unit 421 is omitted, an input patch is tessellated at a fixed tessellation level. The fixed tessellation level can be defined through an OpenGL Application Programming Interface (API) function. If the tessellation evaluation processing unit 423 is omitted, a patch processed by the tessellation control processing unit 421 is passed through and may be captured by a transform feedback mechanism or drawn as points.

Taken together, these mechanisms allow for multi-pass algorithms where a patch is first processed by the tessellation control processing unit 421 and saved to a memory for later reuse. The process of saving a patch to memory involves configuring the tessellation primitive generator 422, tessellation evaluation shader 423 to pass the input patch attributes through the pipeline such that a later stage such as primitive assembler 424 can write these attributes out to a memory such as system memory 104 or PP memory 204. The processed patches are then read from memory and passed back into the graphics processing pipeline 400—either once, or multiple times, and are tessellated without incurring the computational overhead of a tessellation control processing unit 421 that would otherwise take place using a fixed tessellation level.

In sum, an assembly-level and a high-level programming model for tessellation are disclosed.

Advantageously, embodiments of the invention, such as the assembly-level implementation, provide an assembly target that can be used for off-line compilation of tessellation shader programs and enhances overall application program performance. The high-level tessellation programming model incorporates a barrier instruction that provides control over the execution shader programs without requiring the lockstep configuration of the assembly-level implementation. Input/output blocks—each utilized by the both the assembly-level and high-level implementations, are connected by name between graphics processing pipeline 400 stages, which advantageously minimizes the number of API calls required to transfer data between the shaders. Additionally, patches may be "captured" and "played back" to reduce redundant tessellation operations, thereby enhancing the performance of the graphics processing pipeline 400.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for tessellating patches, the method comprising:
   receiving an input block that defines a plurality of input patch attributes for each patch as well as instructions for processing each input patch;
   launching a plurality of threads to execute the instructions to generate each vertex of a corresponding output patch based on the input patch, the plurality of threads including one thread per vertex of the output patch;
   synchronizing reads of values written during instruction execution so threads can read and further process the values of other threads;
   assembling an output patch from the outputs of each of the threads; and
   emitting the output patch for further processing.

2. The method of claim 1, wherein each patch includes a plurality of per-patch attributes and a plurality of vertices, and each vertex includes a plurality of per-vertex attributes.

3. The method of claim 1, wherein the values belong to the output patch.

4. The method of claim 3, wherein each thread is permitted to read each vertex of the output patch but is permitted to write only to the corresponding output vertex.

5. The method of claim 1, wherein the instructions are derived from assembly-level instructions that do not need to be compiled from high-level code prior to being executed.

6. The method of claim 1, wherein each thread that has completed execution of a current instruction cannot execute a next instruction until all other threads have also completed execution of the current instruction.

7. The method of claim 1, wherein the instructions are derived from high-level instructions that need to be compiled prior to being executed.

8. The method of claim 1, wherein at least one of the instructions is a barrier instruction that stalls the execution of any shader instructions subsequent to the barrier instruction in the shader program until all shader instructions prior to the barrier instruction in the shader program have completely executed for all threads of the output patch.

9. The method of claim 1, further comprising the step of storing the plurality of output patches to memory, wherein the stored output patches are subsequently included in a different input block to allow further processing on the plurality of output patches.

10. A processor configured to tessellate a plurality of patches by performing the steps of:
   receiving an input block that defines a plurality of input patches as well as instructions for processing each of the input patches;
   receiving an output block to which the plurality of output patches are written;
   launching one thread for each vertex in a corresponding output patch in the plurality of output patches; to generate each vertex of the corresponding output patch based on one or more of the input vertex attributes that correspond to the input patch and the instructions; and
   synchronizing reads of values written during instruction execution so threads can read and further process the values of other threads.

11. The processor of claim 10, wherein the processor is coupled to a memory storing instructions that, when executed by the processor, configure the processor to:
   receive the input block;
   receive the output block;
   for each of the vertices of the output patches, launch a different thread; and
   synchronize reads of values.

12. The processor of claim 11, wherein the values belong to the output patch.

13. The processor of claim 12, wherein each patch includes a plurality of per-patch attributes and a plurality of vertices, and each vertex includes a plurality of per-vertex attributes.

14. The processor of claim 11, wherein each thread is permitted to read each output patch associated with the output block but is permitted to write only to the corresponding output patch.

15. The processor of claim 11, wherein the instructions are derived from assembly-level instructions that do not need to be compiled prior to being executed.

16. The processor of claim 11, wherein each thread that has completed execution of a current instruction cannot execute a next instruction until all other threads have also completed execution of the current instruction.

17. The processor of claim 11, wherein the instructions are derived from high-level instructions that need to be compiled prior to being executed.

18. The processor of claim 11, wherein at least one of the instructions is a barrier instruction that stalls the execution of any shader instructions subsequent to the barrier instruction in the shader program until all shader instructions prior to the barrier instruction in the shader program have completely executed for all threads of the output patch.

19. The processor of claim 11, wherein the processor is further configured to store the plurality of output patches to memory, wherein the stored output patches are subsequently included in a different input block to allow further processing on the plurality of output patches.

20. A computing device configured to tessellate a plurality of patches, the computing device comprising:
   a graphics processing unit that includes the graphics rendering pipeline; and
   a local memory coupled to the graphics processing unit, wherein the local memory stores instructions that configure the graphics processing unit to:
      receive an input block that defines a plurality of input patches as well as instructions for processing each of the input patches;
      receive an output block to which the plurality of output patches are written;
      launch one thread for each vertex in a corresponding output patch in the plurality of output patches, to generate each vertex of the corresponding output patch based on one or more of the input vertex attributes that correspond to the input patch and the instructions; and
      synchronize reads of values written during instruction execution so threads can read and further process the values of other threads.

* * * * *

UNITED STATES PATENT AND TRADEMARK OFFICE
CERTIFICATE OF CORRECTION

| | | |
|---|---|---|
| PATENT NO. | : 9,024,946 B2 | Page 1 of 1 |
| APPLICATION NO. | : 12/879976 | |
| DATED | : May 5, 2015 | |
| INVENTOR(S) | : Patrick R. Brown et al. | |

It is certified that error appears in the above-identified patent and that said Letters Patent is hereby corrected as shown below:

Claims:

Column 19, Claim 10, Line 57, please delete "patches;" and insert --patches,--.

Signed and Sealed this
Twenty-fourth Day of November, 2015

Michelle K. Lee
*Director of the United States Patent and Trademark Office*